US006836239B2

(12) United States Patent
Scott (10) Patent No.: US 6,836,239 B2
(45) Date of Patent: Dec. 28, 2004

(54) METHOD AND SYSTEM FOR DISPLAYING TEXT ON A RADIAL DISPLAY

(75) Inventor: Steven Gregory Scott, Peoria, AZ (US)

(73) Assignee: Aviation Communication & Surveillance Systems, LLC, Phoenix, AZ (US)

( * ) Notice: Subject to any disclaimer, the term of this patent is extended or adjusted under 35 U.S.C. 154(b) by 0 days.

(21) Appl. No.: 10/438,448

(22) Filed: May 15, 2003

(65) Prior Publication Data

US 2004/0227660 A1 Nov. 18, 2004

(51) Int. Cl.[7] .............................. G01S 7/22; G01S 13/95
(52) U.S. Cl. ...................... 342/176; 181/182; 181/183; 181/185; 181/26
(58) Field of Search ................................ 342/176, 179, 342/180, 181, 182, 183, 185, 26

(56) References Cited

U.S. PATENT DOCUMENTS

| | | | | |
|---|---|---|---|---|
| RE30,679 E | | 7/1981 | Evans et al. ................. | 345/472 |
| 5,303,321 A | | 4/1994 | Peaslee et al. ............... | 345/443 |
| 5,410,647 A | | 4/1995 | Peaslee et al. ............... | 345/467 |
| 5,554,992 A | * | 9/1996 | Toth et al. ................... | 342/185 |
| 5,732,384 A | | 3/1998 | Ellert et al. .................. | 701/120 |
| 5,805,100 A | | 9/1998 | Becker et al. ................ | 342/26 |
| 6,211,814 B1 | * | 4/2001 | Benjamin et al. ............. | 342/185 |
| 6,240,341 B1 | | 5/2001 | Snyder ......................... | 701/3 |
| 6,314,370 B1 | | 11/2001 | Curtright ..................... | 701/213 |
| 2003/0210183 A1 | * | 11/2003 | Andrusiak et al. ........... | 342/185 |

OTHER PUBLICATIONS

"Optical modeling of small pixels in reflective mixed–mode twisted nematic cells", Huang, D.D.; Chen, J.; Huang, H.C.; Information Display, 1999. ASID '99. Proceedings of the 5th Asian Symposium on, Mar. 17–19, 1999 pp.:325–328.*

* cited by examiner

Primary Examiner—John B. Sotomayor
(74) Attorney, Agent, or Firm—William R. Bachand; Squire, Sanders & Dempsey L.L.P.

(57) ABSTRACT

A method for displaying horizontally aligned characters on a radial display is disclosed. Each range bin for each scan line is associated with a rectangular grid location to determine the character located in the grid location and the background color and foreground color for the grid location. A font matrix corresponding to the appropriate character is then used to determine if the range bin corresponds to one of the pixels that make up the character or if the range bin corresponds to a background pixel. This determines if the range bin is assigned the foreground color or background color. The method is done for each range bin value and for each scan line. The range bin and scan line information is sent to a display.

47 Claims, 5 Drawing Sheets

METHOD AND SYSTEM FOR DISPLAYING TEXT ON A RADIAL DISPLAY

FIELD OF THE INVENTION

This invention relates to displaying information and more specifically, displaying text on a radial display.

BACKGROUND OF THE INVENTION

Often times there is a need to display textual information regarding the status of an aircraft to an operator of the aircraft or service personnel. For example, when performing diagnostic tests on an aircraft, it is important to display information regarding aircraft parameters to the service personnel. Unfortunately, due to space and cost limitations, dedicated screens for diagnostic information cannot always be provided.

Therefore, the textual information needs to be displayed on existing displays. One display that is available for displaying textual information in a typical aircraft is the weather radar display. The weather radar display is normally used to display weather information detected by the weather radar. The weather radar detects rainfall by emitting an electromagnetic pulse from the weather radar antenna of the aircraft. The pulse is reflected by the water droplets of rain back to the aircraft. The weather radar interprets the reflected signal. The distance to rain is proportional to the time it takes from emitting a pulse to the time it takes to detect a return pulse. The signal strength of the signal is roughly proportional to the intensity of the rainfall.

This information is displayed on a weather radar display. Typically weather radar displays are color cathode ray tube (CRT) displays or color flat panel displays. The weather radar display typically displays the intensity of rain using a spectrum of colors from green to yellow to red to magenta, with green representing light rain and magenta the heaviest.

In a weather radar display the display is drawn as a scan line sweeps across the display, typically from left to right (in some weather radar displays the radial may sweep from right to left, may sweep from right to left and then left to right, or may open like a fan). Because of the way the weather radar display is drawn, such a display is also known as a radial or rho-theta display. In one embodiment of a weather radar display the radar image is comprised of 512 scan line position with each scan line having 512 pixels, also known as range bins.

The problem with using the weather radar display to display text is that the way the scan line moves across the screen makes it difficult to display clear, straight text. Text displayed on a weather radar is typically displayed as curved text, somewhat like text written on the curve of a rainbow. For example, U.S. Pat. No. 5,805,100 entitled "Method and Apparatus for Universal Display of Alphanumeric Data on Radar Displays" and issued on Sep. 8, 1998 to Becker et al., shows text displayed in such a manner. This limits the utility of the weather radar display for displaying textual information. In order to utilize the weather radar screen for text display what is needed is a method for displaying information on a radial display.

SUMMARY OF THE INVENTION

In one embodiment of the invention, a method for displaying text aligned in a virtual Cartesian grid on a radial display is disclosed. In a first step a range bin value on a scan line is converted from a polar coordinate value to a rectangular coordinate value. Next, a virtual text grid location corresponding to the rectangular coordinate value is located. The character assigned to the virtual text grid location is determined. Then a pixel location within the virtual text grid location based on the font matrix of the character assigned to the virtual grid location is determined. The range bin value location is then associated with an attribute of the pixel location. These steps are repeated for each range bin values along a scan line and for each scan line. The text is displayed on the radial display based on the polar coordinates of the range bin values and the associated attributes.

In another embodiment, a display system for displaying text aligned with a horizontal axis on a radial display having a plurality of pixels addressed using a polar coordinate system is disclosed. The system comprises a processor memory, the processor memory including a text array storing the text information to be displayed, the text array comprising a plurality of text records, each of the plurality of text records containing a character to display, a foreground color and a background color. A font array comprising a plurality of font matrixes, is also stored. Each font matrix represents a "m" by "n" bit mapped character that can be displayed as part of the text array. The system also includes a processor unit in communication with the processor memory. The processor unit is operable to calculate a rectangular coordinate value equivalent for each of a plurality of range bin values along each of a plurality of scan lines. Further the processor unit may determine in which text record the calculated rectangular coordinate value equivalent is located to determine a current character, a current foreground color and a current background color. Then the processor unit associates the range bin value along the scan line with a color code, the color code being either the current background color or the current foreground color. The selection of the background color or the foreground color is done by using the font matrix corresponding to the current character to determine if the pixel location corresponding to the range bin value is part of the current character (foreground color) or part of the background (background color). The color code for each range bin values and for each scan lines is sent to the radial display by the processor unit for presentation.

BRIEF DESCRIPTION OF THE DRAWINGS

Non-limiting and non-exhaustive preferred embodiments of the present invention are described with references to the following figures wherein like reference numerals refer to like parts throughout the various views unless otherwise specified.

DETAILED DESCRIPTION OF THE PREFERRED EMBODIMENT

A method and system for displaying text on a radial display, according to various aspects of the invention, provides for the formation of horizontally aligned text on a radial display. The text includes text generated by an on-board processor unit. The text generated includes text related to diagnostic information regarding the performance, status or condition of the processor unit. The processor unit may include any conventional processor unit as described herein. For example, the processor may be a collision avoidance system processor unit.

A method and system for displaying text on a radial display, according to various aspects of the present invention, includes a processor unit for calculating the location of the pixels that will be displayed to form the text and converting those pixel locations to a format that can be received by a display unit for displaying the text on the radial display. The processor unit includes a processor and a memory. The processor receives the textual information, such as diagnostic information generated by the processor unit. The processor unit, in conjunction with information regarding the text font stored in as a table in the memory, calculates the location on the radial display of each pixel that forms the textual information. The locations are stored using a polar coordinate in the memory and are sent to the radial display.

For example radar system 100 of FIGS. 1–4 includes a radar assembly 102, a processor unit 104 and a display unit 106.

Figure 1:
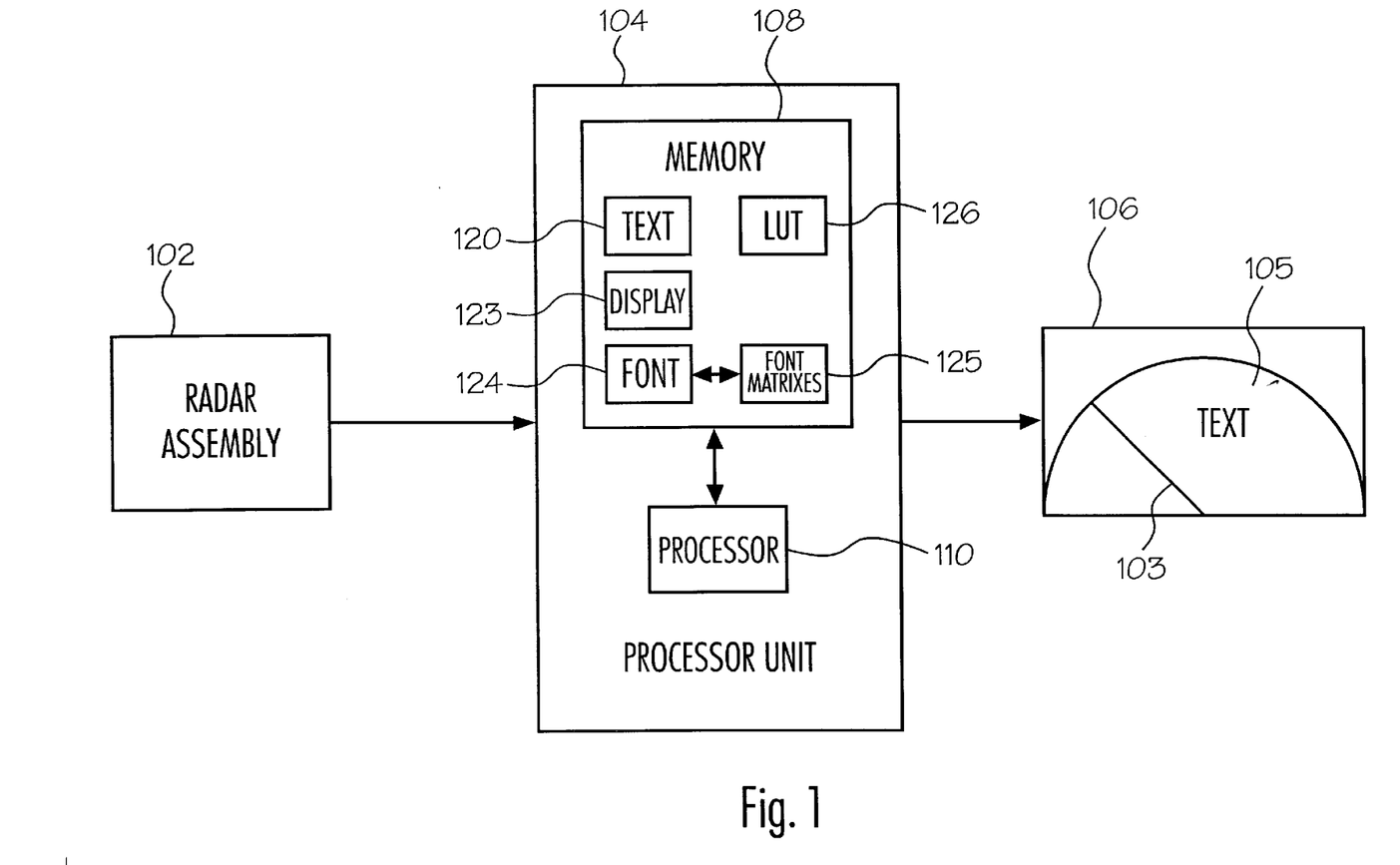
FIG. 1 is a block diagram of a radar display system.

Radar assembly 102 typically includes a transmitter, receiver, related electronics and antenna as a single modular unit. In some embodiments, the antenna is provided separately and all other components are provided in a modular unit such as a line replaceable unit (LRU) that can be removed for repair and upgrade. The transmitter generates an electromagnetic pulse that is sent via the antenna. Pulses reflected by precipitation are received by the antenna and the receiver. The receiver provides these signals to processors to determine the distance to the precipitation and the intensity of the precipitation. Processing can be performed at the radar assembly 102, at the processor unit 104 or shared between the radar assembly 102 and the processor unit 104.

Display unit 106 may be any device that displays an image using a radial scan line. For example, display unit 106 can be a cathode ray tube (CRT) display or a flat panel display, such as an LCD display. Display unit 106 is comprised of pixels that can be addressed using polar coordinates. Display unit 106 is drawn by using a radial or scan line 103. Scan line 103 is composed of multiple pixels, also known as range bins 204. For display units capable of displaying multicolor images, each range bin 204 can be set to a color value. A color value is the color assigned to a given range bin 204 and is selected from a palette of available colors. The palette of available colors is determined by the type of display unit 106. For example, a range bin 204 can be set to a background color or a foreground color. A radial of data is the collection of color values for each range bin for a given scan line 103. As scan line 103 moves about its origin, the range bins for each scan line 103 location will be addressed. That is, display unit 106 receives radar information in polar coordinate form from processor unit 104. According to ARINC 708, incorporated herein by reference, information for all the range bins for a particular scan line 103 is sent together as a packet of information to display unit 106. In one embodiment there are 512 scan line positions and 512 range bins per scan line 103. The number of range bins per scan line 103 is set to 512 range bins for ARINC 708 compatible display units. There can be up to 2048 scan lines on an ARINC 708 compatible display unit.

Processor unit 104 is any device capable of generating textual information for display on a display unit 104. Processor unit 104 also receives data from radar assembly 108, and generates the range bin and scan line values for the information for display on display unit 106. In the present invention text 105 is to be displayed such that a line of test is parallel to a horizontal line such as the bottom of display unit 106. That is, the text is displayed as it would be on a conventional display. In one embodiment, processor unit 104 includes a terrain and traffic collision avoidancy system processor unit ($T^2CAS$ a trademark of ACSS of Phoenix, Ariz.). $T^2CAS$ systems are used for collision avoidance and terrain avoidance. Periodically, a $T^2CAS$ undergoes diagnostic testing, such as a self-test or a maintenance test. In order to display information regarding the diagnostic test such as operator guidance, aircraft parameter and test results, an aircraft display unit may be used. As discussed earlier, a weather radar display unit can be used but current text display methods lead to curved text, which is hard to read and limits the amount of text that can be displayed.

Processor unit 104 includes a memory 108 and a processor 110. Memory 108 include a conventional memory circuits, apparatus or media. Memory 108 provides storage for the text information 120 generated by processor unit 104. Also, memory 108 can store display information 123 such as the scan line/range bin information 124 with associated data prior to being sent to display unit 106, font information including all font matrices, lookup tables 126 containing pre-calculated numerical values needed for converting Cartesian coordinates to polar coordinates and other information as needed. Memory 108 may be one contiguous memory or may be one or more physical memories.

Processor 110 performs any necessary calculation needed to implement the present invention. In one embodiment, the processor unit 104 generates pages of self-test information. The processor unit 104 stores each page of information using the Cartesian (rectangular) coordinate values in memory 108. Processor 110, for each range bin location on each radial, converts the range bin location from a polar coordinate value to a rectangular coordinate value. The rectangular coordinate value is then referenced against the stored text information to determine if the range bin corresponds to an area where a character in the text information is located.

Figure 2:
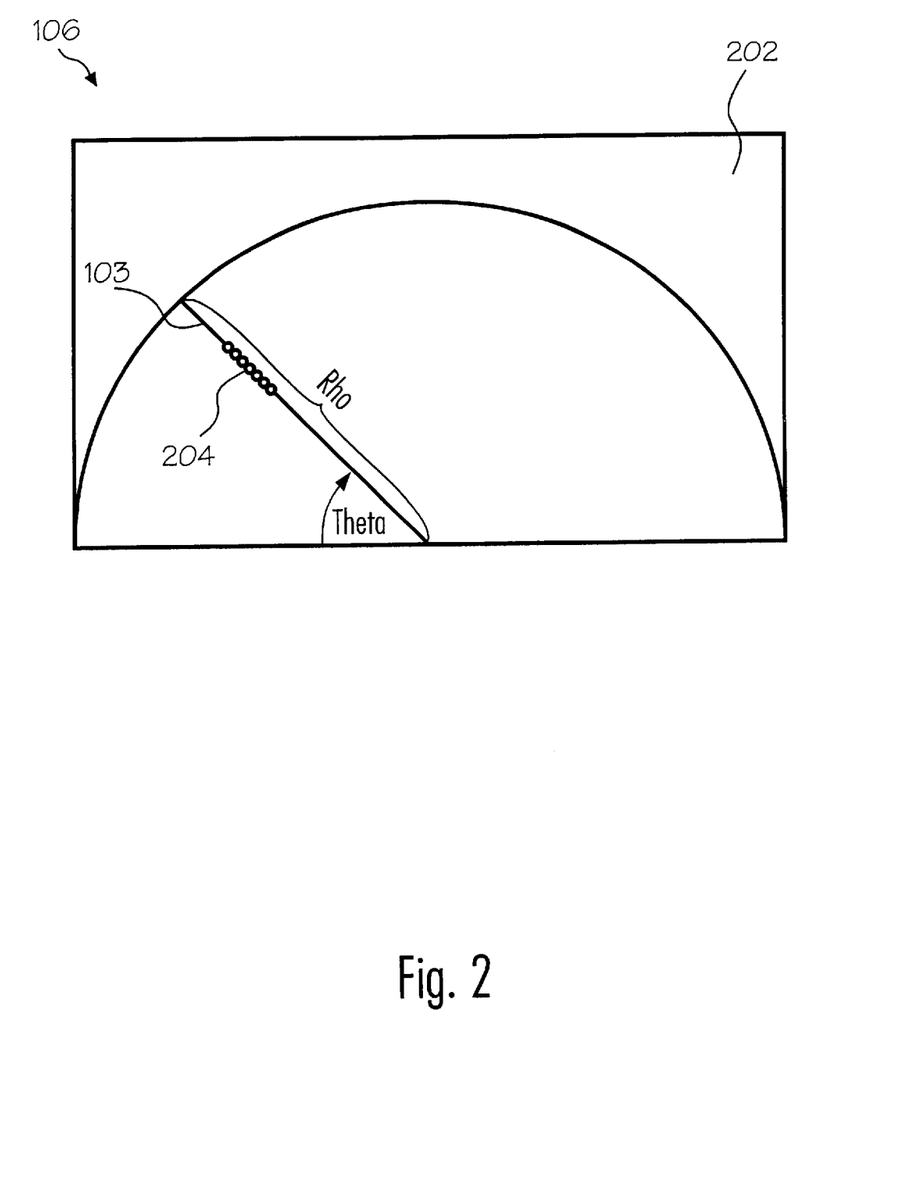
FIG. 2 is an illustration of a radar display.

Display unit 106 includes a screen 202 and scan line 103, as seen in FIG. 2. In a radial display, a scan line 103 typically rotates from left to right sweeping out on an arc that defines the boundary of the image displayed on screen 202. The scan line 103 can also sweep right to left, left to right then right to left repeated, like a windshield wiper, or scan line 103 can operate in a "fan" mode, starting in the center of the display, moving left of center for one scan line, then right of center for the next scan line, and so on such that the image appears to open like a fan. Scan line 103 extends from an origin, O, and is of a fixed length, Rho. Scan line 103 sweeps out an angle, theta. In one embodiment, scan line 103 sweeps out at an angle theta from 90° to −90°, for a total of 180° display. This is for exemplary purposes only as the total angle swept out by scan line 103 may be more or less than 180°. Scan line 103 includes a number of pixels, known as range bins 204, along its length. As discussed previously, each range bin 204 in a given scan line 103 will have information associated with a color value in order to draw the text on the display unit 106. In one embodiment, the maximum number of range bins 204 along a scan line 103 is 512 and the maximum number of scan lines is 512.

Figure 3:
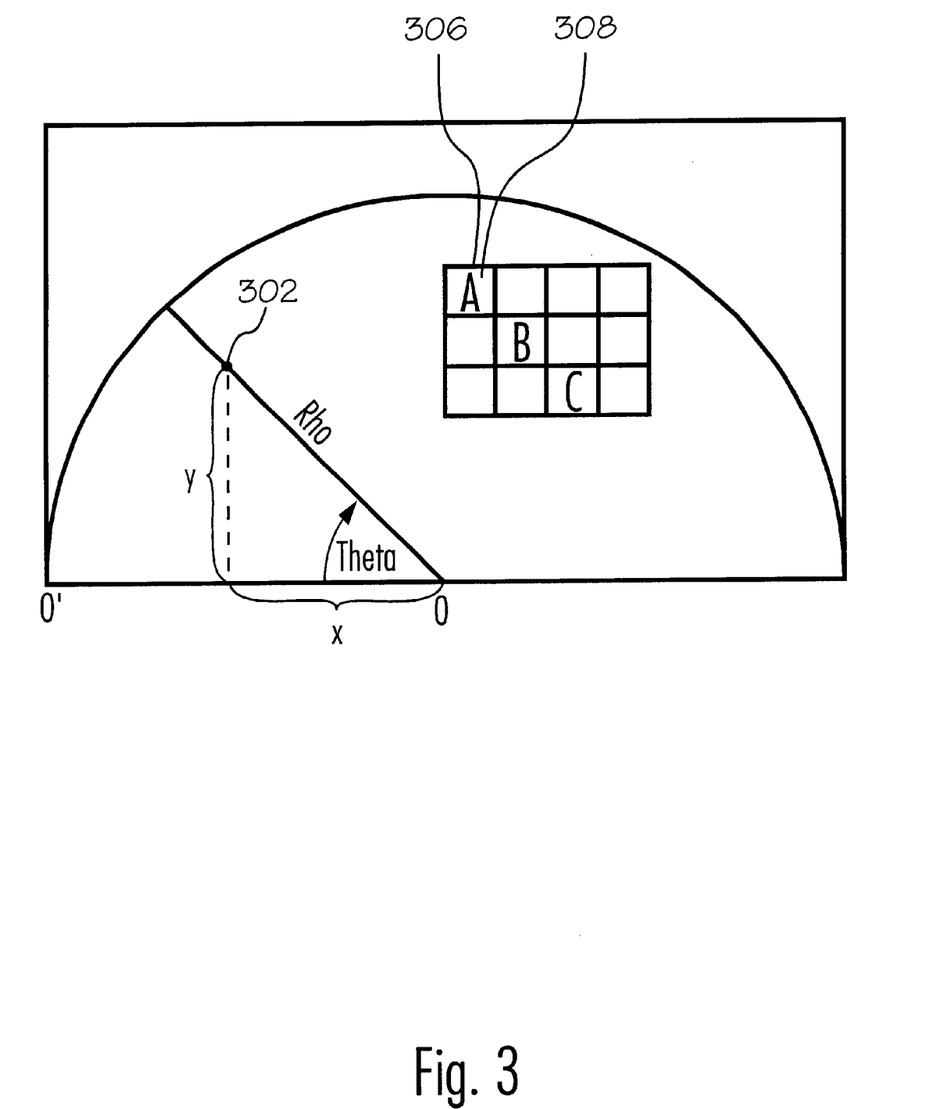
FIG. 3 is a detailed illustration of the radar display.

Referring to FIG. 3, the display also includes a text grid 306. Text grid 306 is a virtual grid referred to for arranging symbols and/or the characters to be displayed in individual grid locations. Text grid 306 is laid out as a Cartesian (rectangular) coordinate grid system. Text grid 306 overlays the display unit 106 and is used to format a page of text information. For example, processor unit 104 may generate diagnostic information to be displayed on display unit 106. This information is formatted using text grid 306 and is stored in memory 108. Text grid 306 does not actually appear on screen 202 as a grid but is a virtual text grid used to format the text in a rectangular coordinate system. Text grid 306 is divided into a number of text grid locations 308. A symbol, such as an alphanumerical character, is positioned within each text grid location 308. The symbols can include a blank space.

As the scan line 103 moves across screen 202, at some point at least one range bin 204 value along a given scan line 103 will intersect a given text grid location 308. In one embodiment, to determine the character value stored at a text grid location 308, the computed rectangular coordinate value of a range bin 204 is used to address the text information 120 stored in memory 108 and as laid out in virtual text grid 306. The character value indicates what character, such as an alphanumeric character, is in that particular text grid location 308. For example, text grid location 308 of text grid 306 may have the character "A" stored. The entire text grid 306 is mapped out with the desired character in each text grid location 308 predetermined. As discussed previously, this is stored as text information 120 in memory 108.

In addition to having a character associated with each text grid location, each text grid location 308 of text grid 306 also has an associated foreground color and background color. The background color and the foreground color are assigned from a pallet of colors. The pallet of colors and number of colors in the pallet depends on the type of display unit used. In one embodiment there are a total of eight colors in the color pallet. The text on the display typically appears as the foreground color and the background as the background color. To properly view the characters, the foreground color is selected to be a contrasting color to the background color. Different characters in different text grid locations may be different colors. In this way, text can be in different colors. For example, text displayed in red denotes a warning.

Figure 4:
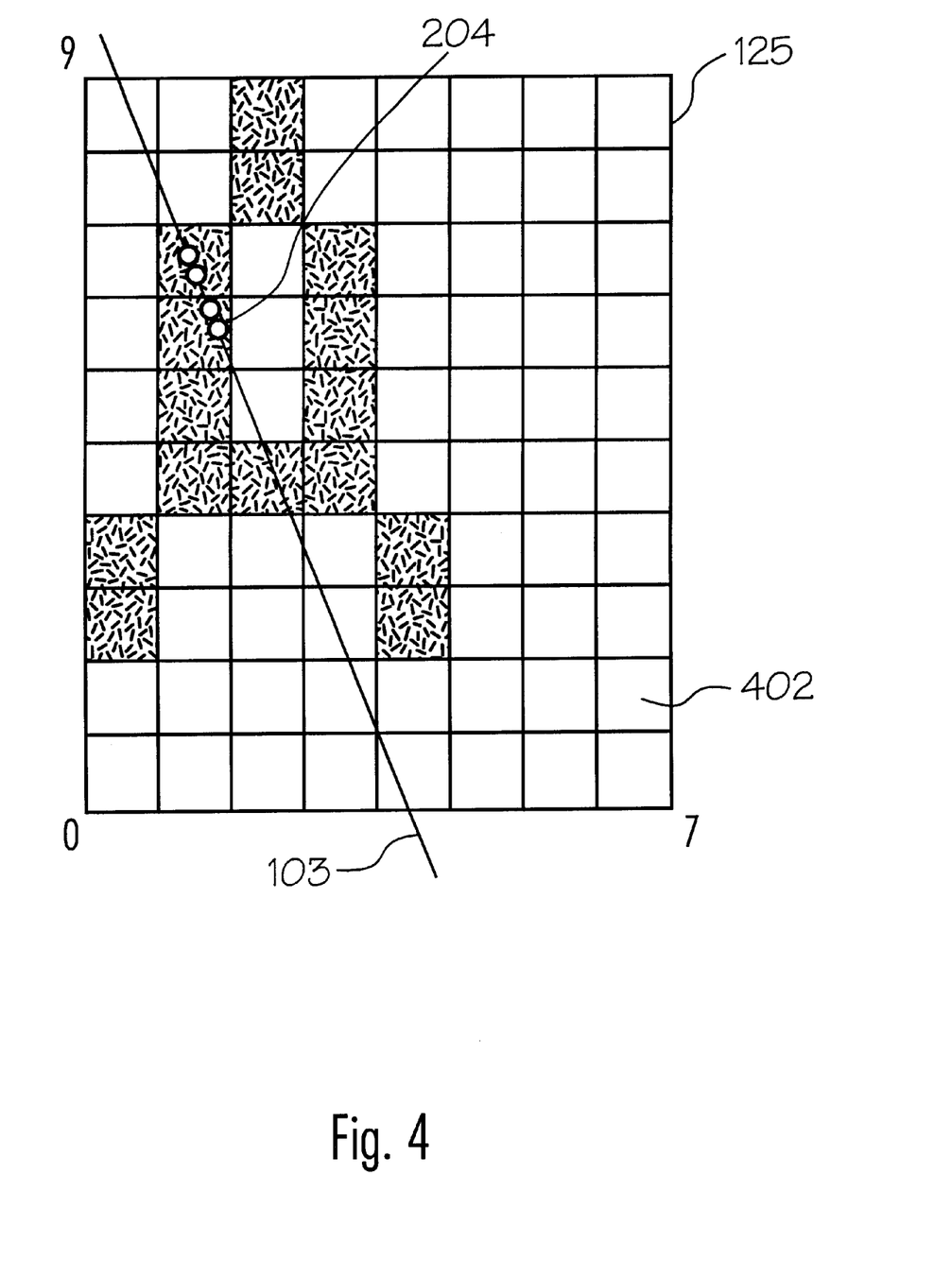
FIG. 4 is an illustration of a font matrix.

Each text grid location 308 comprises a "n" by "m" pixel array. The "n" by "m" pixel array is used to form the character in each text grid location 308. Each character is defined by a font matrix 125 of the character. FIG. 4 illustrates the font matrix 125 for the character "A".In the example of FIG. 4, font matrix 125, and, therefore, text grid location 308, is 8 pixels long by 10 pixels high. As seen in FIG. 4, certain pixels 402 are set to the foreground color, represented by the crosshatching, and certain pixels are set to the background, represented by a blank. The pattern stored in font matrix 125 defines the character. In this example, the character is an "A". While each of the font matrixes 125 in this example is 8 pixels long by 10 pixels high but other sizes can be used based on the size of the character. If a larger resolution or size for each character in a font matrix, there will be less individual text grid locations 308 so less text can be displayed. A font 124 includes a set of font matrixes 125 representing all characters to be displayed. The use of a font 124 allows for the addition of characters by adding new font matrixes for the new characters. Also, the design and/or size of the font can be changed easily by defining a new font with new font matrixes.

As scan line 103 sweeps across screen 202, scan line 103 will intersect individual grid locations 308 of the text grid 306. For a given range bin 204 location along a given scan line 103, the polar coordinate value of that range bin 204 is converted to a rectangular coordinate value which will then be used to locate which grid location 308 the range bin 204 is associated with. Once the text grid location 308 that the range bin 204 location corresponds to is determined, the character at that grid location 308 can be found by addressing the text information 120 stored in memory 108 or using a similar method. Once the text character is retrieved the background color and the foreground color for that text grid location 308 can be found from the text information 120.

Once the character that is located at a particular range bin 204 location is determined, the correct font matrix 125 that represents that character will then be utilized to see if the pixel within the font matrix 125 corresponding to the range bin 204 location is part of the character (and assigned the foreground color) or part of the background (and assigned the background color). The range bin 204 is then associated with the foreground color as background color. This is repeated for each range bin 204 on every scan line 103.

Figure 5:
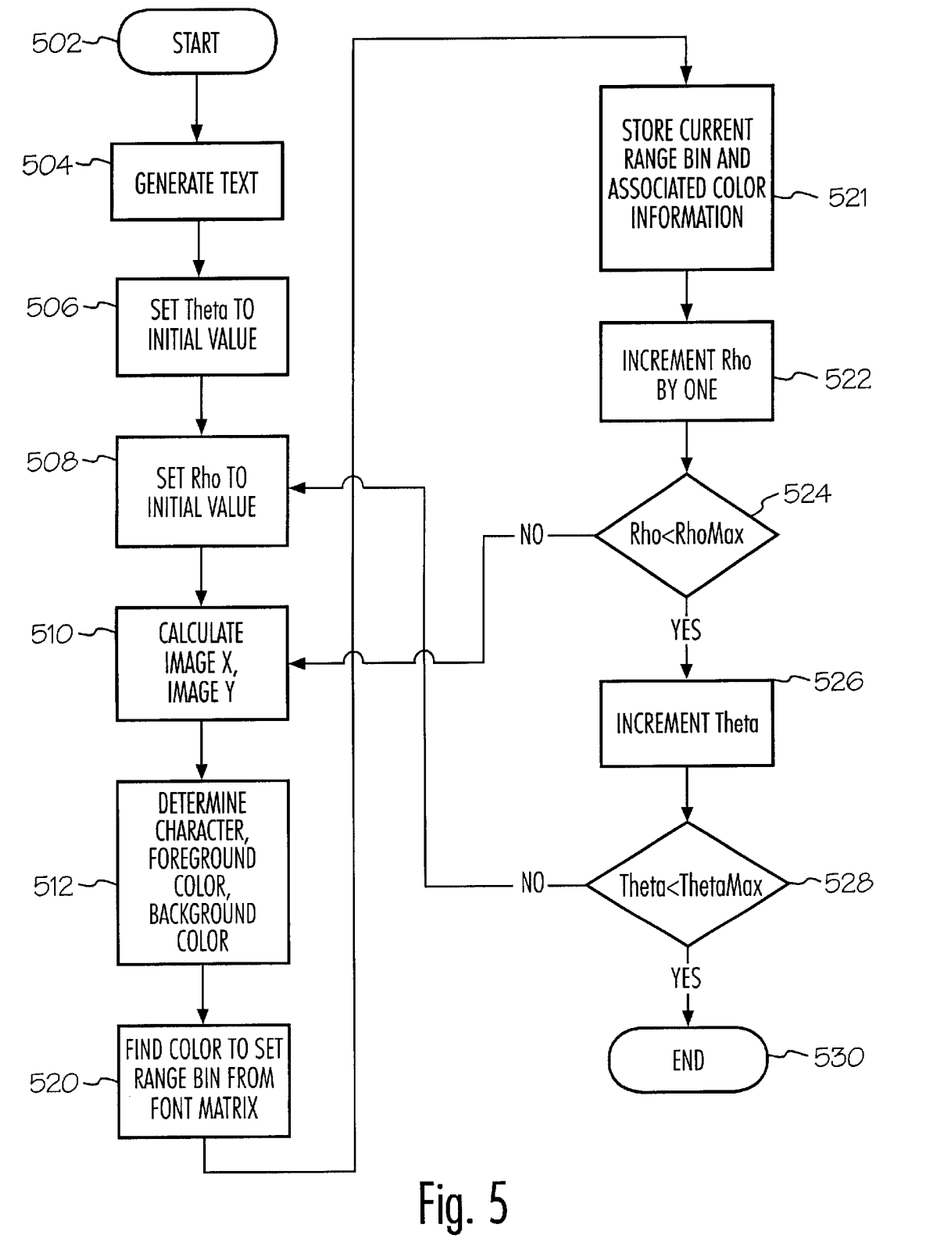
FIG. 5 is a flowchart illustrating the process of displaying text on a radial display.

A method performed by processor 106, for quickly and accurately preparing a description of a presentation of text information on a display is as follows. Referring to FIG. 5, initially, in step 504, prior to displaying text on a display unit 106, the text information is generated and formatted by processor unit 104. The text information defines the characters to be displayed as laid out on a virtual text grid as well as a foreground color and a background color for the character. In one embodiment, the text information is diagnostic information for a system that is generated by the system. For example, the text information is diagnostic information generated by a collision avoidance processor. The information is generated and formatted using the virtual text grid 306. Multiple screens of information can be generated, with each screen laid out using the text grid 306. The text information 120 is stored in memory 108. The text information 120 may be stored as a matrix, in a table or in some other data structure. In one embodiment, when an entire screen of information is requested, such as a request for a screen of diagnostic information, the content of that screen is determined, including where each character will be displayed. The information for the page is stored in an array or matrix wherein each element contains a character to be displayed, a foreground color and a background color for each location in the text grid. The matrix may be indexed using rectangular coordinates such that a text grid location 308 can be determined and the character, foreground color and background color can be retrieved.

Next, each range bin 204 in each scan line 103 is associated with the foreground and background color for each pixel (steps 506–528). The polar coordinate value of each range bin 204 along each scan line 103 is converted to an equivalent rectangular coordinate value. To derive an appropriate conversion algorithm, consider point 302 as illustrated in FIG. 3. Point 302 is an arbitrary range bin 204 along scan line 103. Point 302 can be described as being at a certain angle, theta, and at a length, Rho, along scan line 103. In polar coordinates, point 302 is (Rho, theta). This point can also be referenced in rectangular coordinates. As seen in FIG. 3, point 302 is labeled as (x,y) where "x" is the horizontal component of the rectangular coordinate location and "y" is the vertical component of the rectangular coordinate location. The following well known trigonometric identities relate rectangular coordinates and polar coordinates:

$$\cos(theta) = \frac{x}{rho}$$

$$\sin(theta) = \frac{y}{rho}$$

Where theta is the angle the current scan line 103 makes with the horizontal axis, Rho is the current range bin, and x and y are the horizontal and vertical location of the point in rectangular coordinates. Re-arranging the equations yields:

x=rho(cos(theta))

y=rho(sin(theta))

The following is true if the origin is point 0 as shown in FIG. 3. However, this conversion will give negative x values for all pixels in the right half of display unit 106. For simplification, and in order to deal with only positive numbers, it is convenient to translate the origin for point 0 to point 0'. So x will be equal to the x distance the origin is shifted less the calculated x value of:

$x = x_{shifted} - rho(\cos(theta))$

The y calculation stays the same since the origin is shifted in the x direction only. In the example of FIG. 3, x translated is the maximum Rho value or RhoMax since the origin is shifted by one radial length and one radial is as long as the maximum Rho value.

Thus, from the above equations a rectangular coordinate (x,y) value can be calculated for any polar coordinate (Rho, theta) for any range bin along the scan line 103. The (x,y) value may also be scaled based on a relationship between the maximum Rho value and the maximum y value. This scaling factor is known as the image density. Therefore, for any range bin 204 in polar coordinates (Rho, theta) the equivalent rectangular coordinate (x,y) can be calculated as:

IMAGE X=(RhoMax−rho(cos(theta)))×image density

IMAGE Y=Rho(sin(theta))×image density

Where RhoMax is the maximum Rho value (or range bin value, which, in one embodiment is 512), Rho is the current Rho value (or range bin value). Theta is the current angle the scan line is making with regards to a horizontal axis (the x-axis). The image density value in one embodiment is set to one half (0.5). Setting the image density to one half doubles the number of range bins passing through a pixel of the display unit 106.

After the text is generated and stored in memory, each range bin in the first scan line will be associated with the correct foreground color and background color. This is done by calculating the Image x and Image y value for each range bin along the scan line. The angle variable, theta, is set to its initial value in step 506. For the embodiment shown in FIG. 2, the initial theta is zero degrees. Depending on the display, this value may not initially be 0° especially those that do not display a full 180°. In step 508, the Rho value is set to 0, which represents the first range bin.

In step 510, the Image x and Image y values are calculated for the first range bin location. As mentioned before, this value will give the rectangular coordinate value (x, y) value for the polar coordinate (Rho, theta) location.

In order to enhance computational efficiency, some or all of the above operations can be pre-calculated and stored in a look-up table 126 in memory 108. In one embodiment the sine and cosine of each possible theta value are pre-calculated. The pre-calculated values are then stored in a lookup table 126 or similar structure. For example, look-up table 126 may be an array of values containing the Image x and Image y value for each Rho and theta value. Then, the pre-calculated values can be acquired from the look-up table 126 instead of by calculation. This increases computational efficiency.

Once the Image x and Image y equivalent value of the value of the range bin 204 is determined in step 510, the text grid location that the Image x, Image y value is located in is calculated in step 512. The x and y value of the text grid is determined by:

$$\text{Text Grid } x = \frac{\text{IMAGE } X}{x \text{ Grid Size}}$$

$$\text{Text Grid } y = \frac{\text{IMAGE } Y}{y \text{ Grid Size}}$$

The (x Grid Size) and (y Grid Size) are chosen based on the size of the characters to be displayed in each individual text grid location. In one embodiment the font size is 8×10 pixels, so (x Grid Size)=8 and (y Grid Size)=10. As indicated before, the text memory stores the character for each text grid location as well as the background color and foreground color for each text grid location. The text grid x and text grid y values, in one embodiment, are used to query the text information 120 stored as a matrix or table to determine the character, foreground color, and background color associated with the text grid values. Therefore, in this step, the current Rho, theta value is associated with the character in the text grid as well as the background color and the foreground color.

Once the character and color values are determined, the font matrix for that character is used to determine if the range bin 204 intersects a pixel in the font matrix 125 that corresponds to part of the character or part of the background (step 514). To determine what part of the font matrix the current range bin intersects with, the modulo of the rectangular coordinates (x and y location) of the range bin must be calculated. The modulo of a number, a, with respect to a base, b, is r, the remainder of a divided by b. The base to use is the x range and y range of the font matrix 125. This is expressed as:

a mod b=r

For example, if a=21 and b=8 then r=5.

Generally, Font x=IMAGE X mod x grid size

Font y=IMAGE Y mod y grid size

In the embodiment where font matrix 125 is an 8×10 matrix, Font x takes a value from 0 to 7 and Font y takes a value from 0 to 9. The (Font x, Font y) coordinate will then give the pixel location in the font matrix corresponding to the polar coordinate (Rho, theta) location of the range bin 204 along the scan line 103.

After the pixel location is determined, the font matrix for the character is checked to see if the pixel corresponds to part of the character or part of the background. For example, if (Font x, Font y) is equal to (4,2), then, for the example of FIG. 4, that pixel is part of the character and the range bin will be assigned the foreground color. If the (Font x, Font y) is (5,2) then, as seen in FIG. 4, that pixel is part of the background and, therefore, the range bin 204 is assigned a background color. This is done for each range bin 204 along a scan line 103 and repeated for each scan line 103.

In step 521, the current range bin value and the associated color information is stored in memory 108. The range bin values can be stored as each range bin for a given scan line is calculated in step 514. Or, all of the range bin values for a given scan line can be determined and then stored to a memory such as memory 108. The memory can store one scan line, the collection of all scan lines, or a subset of all scan lines before sending the range bin values for each scan line to display unit 106. In one embodiment, all range bin values for all scan line locations are calculated and stored in a memory before being sent to display unit 106. For all scan line values are stored in memory, any scan line can be sent over to display from left to right, right to left, like a fan or in an order. Therefore, the scan lines can be sent such that the text is displayed as the scan line moves from left to right, right to left from the center outward or any other format. Alternatively, a queue of scan lines can be used. In this embodiment, each scan line is generated and received at a buffer, such as a memory. The scan lines are removed from queue and sent to the display unit 106.

In step 522, the Rho value is incremented by 1. In step 524 the current Rho value is checked to see if the current Rho value is larger than the maximum Rho value. The maximum Rho value is the maximum range bin. In one embodiment, the maximum Rho value, RhoMax, is 512. If Rho is less than RhoMax, the process goes back to step 510, where Image x, Image y, text grid x, text grid y, font x, font y are calculated for the new Rho value and the previous theta value. This continues for all Rho values (range bins 204) along a scan line 103 for each angle, theta.

In step 524, if Rho is greater than RhoMax, then in step 526 the theta value is incremented. Typically, theta is incremented by 1/# of scan lines, as measured in degrees. In one embodiment there are 512 scan lines. Then in step 528 it is determined if the current theta value is greater than the maximum theta value. In the embodiment of FIGS. 2 and 3, the maximum theta is one hundred and eighty degrees (180°). If theta is greater than the maximum theta, all calculations are completed and all the text for one screen of display has been associated with each Rho, theta value and the process ends in step 530. By ending, the stored range bin value can be sent for display at this point if they were not sent in step 523. To continue to display the page, the process would start over again at step 506. If new text needs to be displayed, the process starts again in step 504 where the new text is generated or retrieved from memory. If the current theta value is not greater than theta max, then the process continues in step 508 where Rho is set to 0 and, in the following steps, Image x, Image y, text grid x, text grid y and font x, font y are calculated for new theta and Rho values.

Having now described preferred embodiments of the invention, alterations and modifications that do not depart from the spirit of the invention may occur to those skilled in the art. The invention is thus not limited to the preferred embodiments but is instead set forth in the appended claims and legal equivalents thereof.

What is claimed is:

1. A method for displaying text aligned in a virtual Cartesian grid on a radial display comprising:

(a) converting a range bin value location on a scan line from a polar coordinate value to a rectangular coordinate value;

(b) locating a virtual text grid location corresponding to the rectangular coordinate value;

(c) determining a character and attributes of the character assigned to the virtual text grid location;

(d) determining a pixel location within the virtual text grid location based on the font matrix of the character assigned to the virtual grid location;

(e) associating the range bin value location with an attribute of the character based on the content of the pixel location;

(f) repeating the steps of a through e for each range bin value location along a given scan line;

(g) repeating the steps a through f for each scan line position; and (h) display the text on the radial display based on the polar coordinates of the range bin values and the associated attributes.

2. The method of claim 1 wherein the one or more attributes of the character is a foreground color and a background color.

3. The method of claim 1 wherein the step of determining a character further comprises using a text array indexed by the rectangular coordinate value of the range bin value to determine a character.

4. The method of claim 1 wherein the step of determining a character further comprises using a text array indexed by the rectangular coordinate value of the range bin value to determine a foreground color and a background color.

5. The method of claim 1 further comprising the step of generating a screen of text before step (a) and storing the text in a text array.

6. The method of claim 1 wherein the radial display is a radar display screen.

7. The method of claim 5 wherein the screen of text is generated by a processing unit.

8. The method of claim 7 wherein the processing unit is a terrain and traffic collision avoidancy system processing unit and the screen of that.

9. The method of claim 1 wherein the step of converting a range bin value further comprises the steps of:

calculating the horizontal component of the polar coordinate value;

calculating the vertical component of the polar coordinate value; and forming a rectangular coordinate value from the horizontal component and vertical component.

10. The method of claim 9 wherein the steps of calculating the horizontal component further comprises using a table of pre-calculated values to calculate the horizontal component.

11. The method of claim 9 wherein the step of calculating the vertical component further comprises using a table of pre-calculated values to calculate the vertical component.

12. A display system for displaying text aligned with a horizontal axis on a radial display having a plurality of pixels addressed using a polar coordinate system comprising:

a processor memory comprising:

a text array storing text information to be displayed, the text array comprising a plurality of text records, each of the plurality of text records containing a character to display, a foreground color and a background color;

a font array comprising a plurality of font matrixes, each font matrixes representing a m by n bit mapped character that can be displayed as part of the text array; and a processor unit in communication with the processor memory the processor unit operable to:

calculate a rectangular coordinate value equivalent for each of a plurality of range bin values along each of a plurality of scan lines;

determine in which text record the calculated rectangular coordinate value equivalent is located to determine a current character, a current foreground color and a current background color;

associate the range bin value along the scan line with a color code, the color code being either the current background color or the current foreground color, the color code determined by using the font matrix corresponding to the current character to determine if the range bin value is part of the current character; and the radial display operable to display the color codes for each range bin values for each scan lines sent to the radial display by the processor unit.

13. The system of claim 12 wherein the processor unit is a terrain and traffic avoidance system.

14. The system of claim 12 wherein the radial display is a weather radar display.

15. The system of claim 12 wherein the range bin values for each scan line are stored in a memory before being sent to the radial display.

16. The system of claim 12 wherein the text information is diagnostic information.

17. The system of claim 12 wherein the conversion to calculate the rectangular coordinate value for each range bin value for each of the scan line positions is pre-calculated and stored in a memory.

18. The system of claim 12 further comprising a weather radar operable to generate weather information displayable on the radial display, the text information displayed with the weather information.

19. A method for displaying horizontally aligned text on a radial display that displays information using a scan line with range bin values along the scan line comprising:

(a) storing textual information in a text memory, the text memory comprising a plurality of text grid locations, each text grid location storing a character to be displayed;

(b) for each of a plurality of range bin locations along the scan line referenced using polar coordinate values:

(i) determining a rectangular coordinate equivalent of the range bin location;

(ii) determining a current character and a foreground color and background color associated with the current character by indexing the text memory using the rectangular coordinate equivalent to locate the current text grid location where the range bin location lies;

(iii) using a font matrix corresponding to the current character and the rectangular coordinates equivalent to determine if the range bin location is associated with the character in the font matrix;

(iv) storing the range bin location and associated color characteristic in a display buffer;

(c) repeating step b for each scan line; and (d) sending the content of the buffer to the radial display.

20. The method of claim 19 wherein the foreground color and a background color are determined by indexing the text memory using the rectangular coordinate equivalent to locate the current text grid location where the range bin location lies.

21. The method of claim 19 wherein the step of using the font matrix further comprises selecting the a font matrix from a collection of front matrix based on the current character.

22. The method of claim 19 wherein the radial display is a weather radar display.

23. The method of claim 19 wherein the textual information is generated by a processing unit performing a diagnostic evaluation.

24. The method of claim 23 wherein the processing unit is a terrain and traffic collision avoidance system processing unit.

25. The method of claim 19 wherein the step of determining a rectangular coordinate equivalent of a range bin location further comprises the steps of:

calculating the horizontal component of the polar coordinate value;

calculating the vertical component of the polar coordinate value; and forming a rectangular coordinate value from the horizontal component and vertical component.

26. The method of claim 25 wherein the steps of calculating the horizontal component further comprises using a table of pre-calculated values to calculate the horizontal component.

27. The method of claim 25 wherein the step of calculating the vertical component further comprises using a table of pre-calculated values to calculate the vertical component.

28. A new method of displaying horizontally-aligned text on a radial display, the radial display having a plurality of range bins and a plurality of scan lines, the method comprising:

providing a rectangular coordinate corresponding to a range bin and scan line;

determining a position in a virtual text grid corresponding to the rectangular coordinate;

determining a character corresponding to the virtual text grid position;

determining a pixel in a font matrix corresponding to the character in accordance with the rectangular coordinate;

reading the font matrix in accordance with the pixel to provide a value;

forming an association of the range bin and the value; and providing a signal for a radial display in accordance with the association.

29. The method of claim 28 wherein the value is a foreground color.

30. The method of claim 28 wherein the value is a background color.

31. The method of claim 28 wherein determining a character further comprises reading a text array in accordance with the rectangular coordinate.

32. The method of claim 28 wherein providing the rectangular coordinate comprises determining a horizontal component of the rectangular coordinate in accordance with a table indexed in accordance with the range bin and scan line.

33. The method of claim 28 wherein providing the rectangular coordinates comprises determining a vertical component of the rectangular coordinate in accordance with a table indexed in accordance with the range bin and scan line.

34. A memory device comprising indicia of instructions for performing the method of claim 28.

35. A traffic and terrain collision avoidance system that performs the method of claim 28.

36. The method of claim 28 further comprising repeating the method for each range bin of the scan line.

37. The method of claim 28 further comprising repeating the method for a plurality of range bins of the plurality of scan lines of the radial display.

38. An apparatus for presenting horizontally-aligned text on a radial display, the radial display having a plurality of scan lines, the apparatus comprising:

a font matrix; and a processor, coupled to the font matrix that:
   provides a rectangular coordinate corresponding to a range bin and scan line;
   determines a position in a virtual text grid corresponding to the rectangular coordinate;
   determines a character corresponding to the virtual text grid position;
   determines a pixel in a font matrix corresponding to the character in accordance with the rectangular coordinate;
   reads the font matrix in accordance with the pixel to provide a value;
   forms an association of the range bin and the value; and
   provides a signal for a radial display in accordance with the association.

39. The apparatus of claim 38 further comprising a traffic and terrain collision avoidance system that determines text to be presented.

40. The apparatus of claim 38 further comprising a radial display, coupled to the processor, for presenting text in accordance with the signal.

41. The apparatus of claim 38 wherein the value is a foreground color.

42. The apparatus of claim 38 wherein the value is a background color.

43. The apparatus of claim 38 further comprising a text array coupled to the processor and wherein the processor determines a character by reading the text array in accordance with the rectangular coordinate.

44. The apparatus of claim 38 further comprising a table indexed in accordance with the range bin and scan line, wherein the table is coupled to the processor, and wherein the processor provides the rectangular coordinate by determining a horizontal component of the rectangular coordinate in accordance with the table.

45. The apparatus of claim 38 further comprising a table indexed in accordance with the range bin and scan line, wherein the table is coupled to the processor, and wherein the processor provides the rectangular coordinate by determining a vertical component of the rectangular coordinate in accordance with the table.

46. The apparatus of claim 38 wherein the processor repeats its functions for each range bin of a scan line.

47. The apparatus of claim 38 wherein the processor repeats its functions for a plurality of range bins of the plurality of scan lines of the radial display.

* * * * *